US010783086B2

(12) United States Patent
Zhou et al.

(10) Patent No.: US 10,783,086 B2
(45) Date of Patent: Sep. 22, 2020

(54) METHOD AND APPARATUS FOR INCREASING A SPEED OF ACCESSING A STORAGE DEVICE

(71) Applicant: HUAWEI TECHNOLOGIES CO., LTD., Shenzhen, Guangdong (CN)

(72) Inventors: Jie Zhou, Hangzhou (CN); Guanghui Liu, Shenzhen (CN); Weiye Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 15/983,592

(22) Filed: May 18, 2018

(65) Prior Publication Data

US 2018/0267901 A1 Sep. 20, 2018

Related U.S. Application Data

(63) Continuation of application No. PCT/CN2016/106000, filed on Nov. 16, 2016.

(30) Foreign Application Priority Data

Nov. 19, 2015 (CN) .......................... 2015 1 0800479

(51) Int. Cl.
*G06F 12/10* (2016.01)
*G06F 12/08* (2016.01)
(Continued)

(52) U.S. Cl.
CPC .............. *G06F 12/10* (2013.01); *G06F 3/061* (2013.01); *G06F 3/0661* (2013.01);
(Continued)

(58) Field of Classification Search
CPC ......... G06F 12/0246; G06F 2212/7201; G06F 3/0679; G06F 12/10; G06F 12/109; G06F 2212/1016; G06F 12/1009
See application file for complete search history.

(56) References Cited

U.S. PATENT DOCUMENTS 6,907,600 B2 * 6/2005 Neiger ................ G06F 9/45537
711/118
8,307,194 B1 * 11/2012 Scott .................... G06F 9/30018
712/34

(Continued)

FOREIGN PATENT DOCUMENTS

CN 101324867 A 12/2008
CN 102023817 A 4/2011

(Continued)

OTHER PUBLICATIONS

Li, Zheng, et al. "A software-defined fusion storage system for PCM and NAND flash." 2015 IEEE Non-Volatile Memory System and Applications Symposium (NVMSA). IEEE, Oct. 2015. (Year: 2015).*

(Continued)

*Primary Examiner* — Charles Rones
*Assistant Examiner* — Hewy H Li
(74) *Attorney, Agent, or Firm* — Fish & Richardson P.C.

(57) ABSTRACT

A method for accessing data is provide, the method includes: receiving a first address and identification information used to identify an address type; and when the identification information indicates a logical address type, converting the first address into a first physical address, and accessing at least one corresponding flash memory chip in the storage device; or when the identification information indicates a physical address type, directly accessing at least one corresponding flash memory chip in the storage device. When the storage device is accessed, a type of an accessed address is determined according to the identification information. If the (Continued)

address is a logical address, the storage controller maps the logical address to a physical address and accesses the physical address; or if the address is a physical address, the storage controller directly accesses the physical address sent by the host.

16 Claims, 4 Drawing Sheets

(51) Int. Cl.
*G06F 3/06* (2006.01)
*G06F 12/02* (2006.01)

(52) U.S. Cl.
CPC ........ *G06F 3/0679* (2013.01); *G06F 12/0246* (2013.01); *G06F 12/08* (2013.01); *G06F 2212/1016* (2013.01); *G06F 2212/1024* (2013.01); *G06F 2212/7201* (2013.01)

(56) References Cited

U.S. PATENT DOCUMENTS

| | | | | |
|---|---|---|---|---|
| 2005/0246487 A1* | 11/2005 | Ergan | ................ | G06F 3/061 711/113 |
| 2007/0288720 A1* | 12/2007 | Cholleti | ................ | G06F 9/5016 711/202 |
| 2008/0155542 A1* | 6/2008 | Maigne | ................ | G06F 9/4843 718/100 |
| 2008/0189485 A1* | 8/2008 | Jung | ................ | G06F 12/0246 711/115 |
| 2009/0271562 A1 | 10/2009 | Sinclair | | |
| 2010/0023811 A1* | 1/2010 | Moyer | ................ | G06F 11/3648 714/47.1 |
| 2010/0082890 A1* | 4/2010 | Heo | ................ | G06F 12/0246 711/103 |
| 2010/0174853 A1* | 7/2010 | Lee | ................ | G06F 12/0246 711/103 |
| 2012/0079171 A1 | 3/2012 | Ju et al. | | |
| 2012/0140561 A1* | 6/2012 | Fukuda | ................ | G06F 12/0246 365/185.18 |
| 2013/0120925 A1 | 5/2013 | Park | | |
| 2014/0129761 A1 | 5/2014 | Kwon | | |
| 2014/0337560 A1 | 11/2014 | Chun et al. | | |
| 2015/0234597 A1 | 8/2015 | He et al. | | |
| 2015/0269098 A1 | 9/2015 | Sugihara | | |
| 2016/0062926 A1 | 3/2016 | Zhao | | |
| 2017/0109089 A1* | 4/2017 | Huang | ................ | G06F 3/0622 |

FOREIGN PATENT DOCUMENTS

| | | |
|---|---|---|
| CN | 103914395 A | 7/2014 |
| CN | 103946828 A | 7/2014 |
| CN | 104252429 A | 12/2014 |
| CN | 105005536 A | 10/2015 |
| CN | 105353989 A | 2/2016 |
| KR | 20140057454 A | 5/2014 |

OTHER PUBLICATIONS

Extended European Search Report, dated Oct. 11, 2018, in European Application No. 16865742.7 (10 pp.).
International Search Report dated Feb. 22, 2017 in corresponding International Patent Application No. PCT/CN2016/106000.
Office Action issued in Korean Application No. 10-2018-7017018 dated Jul. 11, 2019, 11 pages (with English translation).
International Search Report dated Feb. 22, 2017 in corresponding International Patent Application No. PCT/CN2016/106000, 8 pgs.
Written Opinion of the International Search Authority dated Feb. 22, 2017, in corresponding International Patent Application No. PCT/CN2016/106000, 6 pgs.
Chinese Office Action dated Nov. 8, 2017, in corresponding Chinese Patent Application No. 201510800479.1, 5 pgs.

\* cited by examiner

METHOD AND APPARATUS FOR INCREASING A SPEED OF ACCESSING A STORAGE DEVICE

CROSS-REFERENCE TO RELATED APPLICATIONS

This application is a continuation of International Application No. PCT/CN2016/106000, filed on Nov. 16, 2016, which claims priority to Chinese Patent Application No. 201510800479.1, filed on Nov. 19, 2015, The disclosures of the aforementioned applications are hereby incorporated by reference in their entireties.

TECHNICAL FIELD

Embodiments of the present invention relate to the field of data storage, and more specifically, to a method for accessing data stored in a storage device, a storage controller, a host, a storage device, and a storage system.

BACKGROUND

An intelligent terminal device includes a built-in storage device configured to store data. For example, a smartphone usually uses an embedded multimedia card (eMMC) chip as a built-in storage chip. The eMMC chip is obtained by encapsulating an eMMC storage controller and a NAND flash memory chip, and a central processing unit (CPU), a read-only memory (ROM), and a random access memory (Random Access Memory, RAM) are integrated into the eMMC storage controller.

Firmware (Firmware) of the built-in storage device mainly resolves problems such as an inherent bad block and read interference of a flash chip, to improve use reliability of the flash chip, and a flash difference brought by different manufacturers and technologies can be shielded for a host (for example, a CPU in a smartphone). Therefore, the firmware of the storage device usually manages the flash chip by using a flash translation layer (Flash Translation Layer, FTL) algorithm. By means of mapping by using the FTL algorithm, the storage device presents a logical address to the host (Host), and an actual physical address is invisible to the host when the host accesses the storage device.

However, an existing storage device has a relatively small size, a relatively few resources, a relatively weak CPU computing capability, and relatively poor processing performance. Therefore, the host accesses the storage device at a relatively low speed.

SUMMARY

Embodiments of the present invention provide a method for accessing data stored in a storage device, a storage controller, a host, a storage device, and a system, so as to increase a speed of accessing the storage device by the host.

According to a first aspect, an embodiment of the present invention discloses a method for accessing data stored in a storage device, where the method is executed by a storage controller located in the storage device, the storage device further includes at least one flash memory chip that communicates with the storage controller, and the method includes:

receiving a first address used to access a flash memory chip and identification information used to indicate an address type of the first address, where the first address and the identification information are sent by a host; the identification information is first identification information or second identification information; the first address is sent by a logical address processing module located at a bottom software layer of the host, and the logical address processing module determines, after receiving a first logical address sent by a logical address sending module located at an upper software layer of the host, whether the first logical address belongs to a logical address corresponding to operating system data or a logical address corresponding to user data, and when determining that the first logical address belongs to the logical address corresponding to the operating system data, sends the first logical address to the storage controller and sends the first identification information to the storage controller, where in this case, the first address is the first logical address; or when determining that the first logical address belongs to the logical address corresponding to the user data, converts the first logical address into a second physical address, then sends the second physical address to the storage controller, and sends the second identification information to the storage controller, where in this case, the first address is the second physical address; and when it is determined that the identification information is the first identification information, converting the first address into a first physical address, and accessing the flash memory chip according to the first physical address; or when it is determined that the identification information is the second identification information, accessing the flash memory chip according to the received first address.

According to a second aspect, an embodiment of the present invention discloses a data storage method, where the method is executed by a logical address processing module located at a bottom software layer of a host, and includes:

receiving a first logical address sent by a logical address sending module located at an upper software layer of the host;

determining whether the logical address belongs to a logical address corresponding to operating system data or a logical address corresponding to user data; and when determining that the logical address belongs to the logical address corresponding to the operating system data, sending the first logical address to a storage controller, and sending first identification information to the storage controller, where the first identification information is information capable of enabling the storage controller to: after receiving the first identification information, convert the first logical address into a first physical address and access data in a flash memory chip according to the first physical address; or when determining that the logical address belongs to the logical address corresponding to the user data, converting the first logical address into a second physical address, then sending the second physical address to a storage controller, and sending, to the storage controller, second identification information, where the second identification information is information capable of enabling the storage controller to use the second physical address according to the received second identification information to access the data in a flash memory chip.

According to a third aspect, an embodiment of the present invention discloses a storage controller, where the storage controller is located in a storage device, the storage device further includes at least one flash memory chip that communicates with the storage controller, and the storage controller includes a receiving unit, a determining unit, a conversion unit, and an access unit, where the receiving unit is configured to receive a first address used to access a flash memory chip and identification information used to indicate an address type of the first address, where the first address and the identification information are sent by a host; the identification information is first identification information or second identification information; the first address is sent by a logical address processing module located at a bottom software layer of the host; and the logical address processing module determines, after receiving a first logical address sent by a logical address sending module located at an upper software layer of the host, whether the first logical address belongs to a logical address corresponding to operating system data or a logical address corresponding to user data, and when determining that the first logical address belongs to the logical address corresponding to the operating system data, sends the first logical address to the storage controller and sends the first identification information to the storage controller, where in this case, the first address is the first logical address; or when determining that the first logical address belongs to the logical address corresponding to the user data, converts the first logical address into a second physical address, then sends the second physical address to the storage controller, and sends the second identification information to the storage controller, where in this case, the first address is the second physical address;

the determining unit is configured to determine whether the received identification information is the first identification information or the second identification information;

when the determining unit determines that the identification information is the first identification information, the conversion unit is configured to convert the first address received by the receiving unit into a first physical address, and the access unit is configured to access the flash memory chip according to the first physical address obtained by the conversion unit by means of conversion; and when the determining unit determines that the identification information is the second identification information, the access unit is configured to access the flash memory chip according to the first address received by the receiving unit.

According to a fourth aspect, an embodiment of the present invention discloses a host, including a processor and a memory, where the memory stores an instruction to be executed by the processor, the processor executes a software program by reading the instruction, and the software program includes a logical address sending module located at an upper software layer and a logical address processing module located at a bottom software layer, where the logical address sending module is configured to send a first logical address to the logical address processing module;

the logical address processing module is configured to receive the first logical address sent by the logical address sending module;

the logical address processing module is further configured to determine whether the logical address belongs to a logical address corresponding to operating system data or a logical address corresponding to user data; and the logical address processing module is further configured to: when determining that the first logical address belongs to the logical address corresponding to the operating system data, send the logical address to a storage controller, and send first identification information to the storage controller, where the first identification information is information capable of enabling the storage controller to: after receiving the first identification information, convert the first logical address into a first physical address and access data in a flash memory chip according to the first physical address; or the logical address processing module is further configured to: when determining that the logical address belongs to the logical address corresponding to the user data, convert the first logical address into a second physical address, then send the second physical address to the storage controller, and send, to the storage controller, second identification information, where the second identification information is information capable of enabling the storage controller to use the second physical address according to the received second identification information to access the data in a flash memory chip.

According to a fifth aspect, an embodiment of the present invention discloses a storage device, including the storage controller mentioned in the third aspect and at least one flash memory chip.

According to a sixth aspect, an embodiment of the present invention discloses a communications system, including the storage device mentioned in the fifth aspect and the host mentioned in the fourth aspect.

In the embodiments of these aspects, when the host accesses the storage device, the storage controller of the storage device can determine a type of an accessed address according to the identification information. If the address is a logical address, the storage controller maps the logical address to a physical address and accesses the physical address; or if the address is a physical address, the storage controller directly accesses the physical address sent by the host. The physical address is obtained by converting the logical address from an upper software layer according to preset address region information. In this way, if the address is a physical address, the conversion process is performed by the host, and the storage controller of the storage device does not need to perform conversion again. Because a processing capability of the host is higher than that of the storage controller, a speed of accessing the storage device by the host can be increased.

In the embodiments of these aspects, the operation data is data of software itself of operating system and some data generated by the operating system in a running process; and the user data is data that is written by a user into the storage device after the operating system is installed.

In addition, in the embodiments of these aspects, after power-on, if no identification information is received, the storage controller uses an address in a received access request as a logical address, converts the address into a third physical address, and then accesses the flash memory chip according to the third physical address. In this way, the storage controller may be compatible with an application scenario based on an existing boot loader because the boot loader is usually a fixed program and is accessed by using a logical address. In addition, because the storage controller does not receive identification information after receiving an access request of the boot loader, the storage controller converts a logical address in the access request into a physical address, so as to accurately access the flash memory chip.

DESCRIPTION OF EMBODIMENTS

The following clearly describes the technical solutions in the embodiments of the present invention with reference to the accompanying drawings in the embodiments of the present invention.

Figure 1:
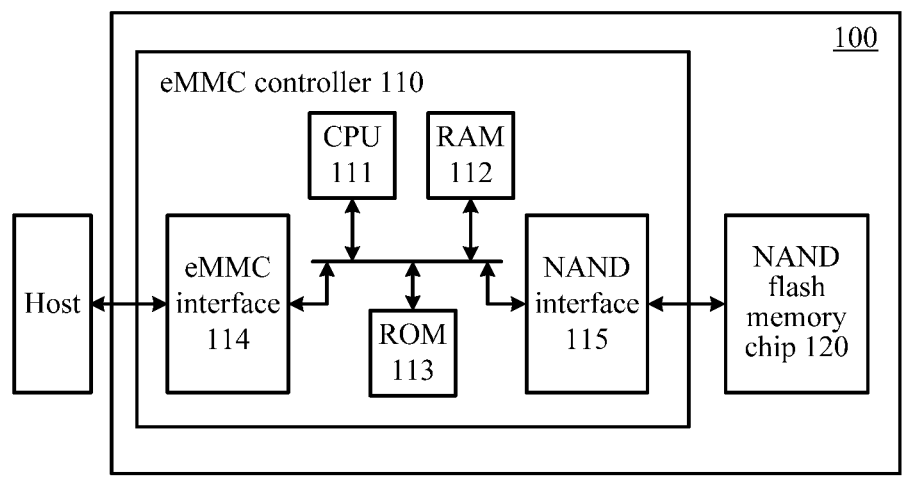
FIG. 1 is a schematic structural diagram of an eMMC chip in the prior art.

FIG. 1 is a schematic block diagram of a storage device that can be applied.

The storage device 100 shown in FIG. 1 is an eMMC chip existing in the prior art. The eMMC chip may be used as a built-in storage chip of an intelligent terminal. As shown in FIG. 1, the storage device (for example, the eMMC chip) includes an eMMC storage controller 110 and a NAND flash memory chip 120 (flash memory chip for short below). The eMMC storage controller 110 includes a central processing unit (Central Processing Unit, CPU) 111, a random access memory (Random Access Memory, RAM) 112, a read-only memory (Read Only Memory, ROM) 113, an eMMC interface 114, and a NAND interface 115.

The eMMC interface 114 is configured to connect to a host, so as to connect the storage device 100 and the host. Through the eMMC interface 114, the host can send command information stipulated in an eMMC protocol and an address and data that correspond to the command information. The host host in the embodiments of the present invention may be a processor of a terminal device, for example, a CPU of a smartphone.

The NAND interface 115 may be configured to connect the eMMC storage controller 110 and the NAND flash memory chip 120. There may be one or more NAND flash memory chips 120, and for ease of description, only one NAND flash memory chip 120 is marked. Specifically, the eMMC storage controller 110 may send command information to the NAND flash memory chip 120 through the NAND interface 115, so as to complete an access operation. The access operation may be a read operation, a write operation, an erase operation, or the like that is performed on data of the NAND flash memory chip 120.

The eMMC storage controller 110 may manage the NAND flash memory chip 120 by using an FTL algorithm. By means of mapping by using the FTL algorithm, the storage device 100 presents a logical address to the host. That is, an actual physical address is invisible when the host accesses the storage device 100 in the prior art.

In addition, a garbage collection (Garbage Collection, GC) function, a wear leveling (Wear Leveling, WL) function, and another function may be further provided in firmware of an existing eMMC chip, so as to improve reliability of a NAND flash chip and prolong a service life of the NAND flash chip. However, these algorithms run automatically in a process of using the eMMC chip, without being perceived by the host. In addition, to reduce power consumption, the host enables the eMMC chip to enter a dormant state when no storage space needs to be read or written. In the dormant state, the foregoing algorithms do not run. In this way, the eMMC chip has no sufficient time to perform a GC operation, a WL operation, and another operation, and performance of the chip is decreased after the chip is used for a period of time. Consequently, user experience is degraded. Moreover, internal implementation of the eMMC chip is invisible to the host. Therefore, it is difficult to locate a fault when the fault occurs. This is another disadvantage of the existing eMMC chip.

In addition, another similar architecture may also be applied based on an SD (Secure Digital) card. An SD-card-based application scenario is similar to that in FIG. 1, provided that the eMMC interface in FIG. 1 is replaced by an SD interface and the eMMC controller in FIG. 1 is replaced by an SD controller.

Embodiment 1

Figure 2:
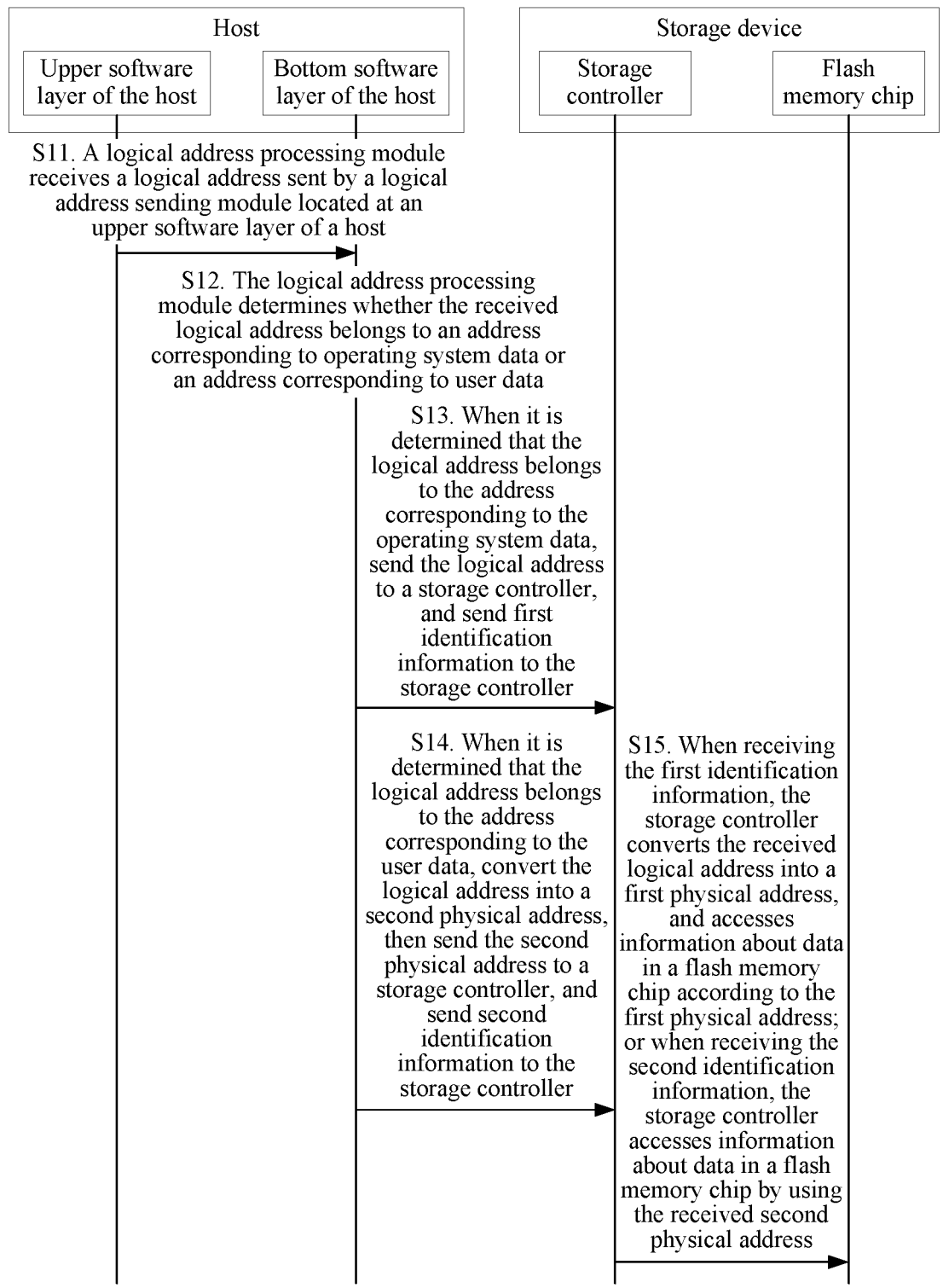
FIG. 2 is a schematic flowchart of Embodiment 1 of the present invention.

Based on the foregoing existing hardware structure, referring to FIG. 2, Embodiment 1 of the present invention provides a method for accessing data in a storage device. The method includes the following steps.

S11. A logical address processing module located at a bottom software layer of a host receives a logical address sent by a logical address sending module located at an upper software layer of the host.

From a perspective of software, the host generally may include the following parts: an application at an uppermost layer, and a file system and a kernel that follow the application in sequence. Usually, the bottom software layer is a "kernel" layer. The logical address processing module in this step may be located in the kernel, that is, in the host. Compared with the prior art, code at the kernel layer needs to be modified. Correspondingly, upper software layers are usually an "application" layer and a "file system" layer, that is, the logical address sending module may be a software module that is located in the application or the file system and that is configured to send a logical address. Generally, a relatively perfect operating system includes a file system, configured to organize and manage a file in the system. A request that comes from an application layer and that is used to access the storage device is first sent to the file system, and then the file system forwards the request to a logical address processing module. In this case, a software module that is in a file system and that is configured to send a logical address may be considered as a "logical address sending module". If there is no file system, a logical address may be directly sent to a logical address processing module by an application. In this case, a module that is in the application and that is configured to send the logical address is referred to as a "logical address sending module".

In addition, it can be understood that an ultimate objective of sending the logical address by the upper software layer is to access the storage device. To achieve the objective, some additional information may still need to be added in practice with reference to different access types and different access protocols that are used. For example, when an eMMC protocol is used for access, some basic operation information such as an operation type (for example, read or write), an operation quantity, and a length, and some information defined in protocols, such as a check bit, a start bit, and an end bit, are further required. These belong to a technology well known by a person skilled in the art, and details are not described herein. An emphasis of this embodiment is to describe processing related to a logical address in detail.

S12. The logical address processing module determines whether the received logical address belongs to an address corresponding to operating system data or an address corresponding to user data.

In this embodiment, the host needs to manage a physical address space and a logical address space of the storage device, that is, the host needs to know physical address spaces of the storage device and needs to perform mapping between a physical address and a logical address. In addition, the host further needs to divide the physical address spaces of the storage device. Some physical address spaces are used to store the operating system data, and the others are used to store the user data. The operation data includes data of software itself of operating system and some data (for example, a log file and a file related to a file system) generated by the operating system in a running process. The user data is data that is written by a user into the storage device after the operating system is installed, typically, for example, some application software installed by the user and data generated by the application software in a running process.

In the prior art, a storage controller manages an address space (including a logical address and a physical address of the storage device. In this embodiment, this is equivalent to that the host is enabled to have the function, and that the host and the storage controller complete respective address conversion functions. A method used by the host to complete the function is similar to a method used by the storage controller to complete the function in the prior art. In an example in which the storage device includes a 16 G physical address space, and the host communicates with the storage controller based on the eMMC protocol, the following several steps are mainly included.

S301. The host sends a command (for example, a command CMD 6) to the storage controller to configure a related register and define a range of 0 G to 2 G for a logical address space (corresponding to the operating system data).

S302. The storage controller maps some physical addresses to logical addresses of 0 G to 2 G according to the register (because some physical addresses are required for information management, where these logical addresses are greater than 2 G, for example, is 2.5 G).

S303. The storage controller configures a range of a remaining available physical address space (for example, 13.5 G, corresponding to the user data) for another related register.

S304. The host reads the another related register (for example, by using a command CMD 8) to know available physical addresses, and maps these physical addresses to logical addresses.

A specific implementation (for example, a specific command format or register selection) of the configuration is a technology well known by a person skilled in the art, and details are not described herein. In addition, a person skilled in the art also knows that, based on another protocol, an adaptive modification may be made according to a characteristic of the another protocol to implement a similar function.

It can be learned from the foregoing steps that, for a logical address in an address space 0 G to 2 G, the storage controller completes mapping between a logical address and a physical address, but a host does not participate. That is, the host can know only the logical address in 0 G to 2 G, but does not learn a physical address to which the logical address in 0 G to 2 G is mapped.

On the contrary, for remaining physical addresses (for example, a remaining 13.5 G space), the host completes mapping between a logical address and a physical address, but the storage controller does not participate. That is, the host, instead of the storage controller, knows which logical addresses are mapped to which physical addresses.

It should be noted that, in this embodiment, a software module such as an application or a file system does not need to be modified. Therefore, the operation can be compatible with an existing system to the greatest extent, and is easily implemented.

S13. When it is determined that the logical address belongs to the address corresponding to the operating system data, send the logical address to a storage controller, and send first identification information to the storage controller.

This step can be simply understood as "transparently transmitting" the logical address to the storage controller, that is, the logical address processing module "does not process the logical address", but directly transmits the logical address to the storage controller. Certainly, the "does not process the logical address" herein is a relative (relative to a step of converting the logical address into a physical address in S14) and colloquial concept. In practice, strictly speaking, because a specific interface protocol is involved, the "logical address" needs to be transferred by calling a command in a corresponding protocol, and is not forwarded without any processing. However, because the process belongs to a process in which a standard operation is performed based on a protocol, and does not relate to a change to data that really needs to be transmitted, the process is usually considered as a "transparent transmission" process without a data change.

It should be noted that the foregoing "command" may be information used for interaction between both communication parties, and may be referred to as a term such as a "packet" or a "message" instead of a command in some protocols. A person skilled in the art learns that all these are in essence used to transfer information according to some specified formats. Therefore, a subsequent process that relates to interaction based on a particular protocol (for example, transferring a command, transferring a packet, or transferring a message) is not described in detail in this embodiment.

"First" in the "first identification information" in this step is used only to distinguish the first identification information from other identification information, and does not represent a special meaning. Similarly, other "first" (for example, the first physical address) and "second" (for example, the second physical address) that appear in this embodiment all represent a similar meaning.

In addition, it should be noted that, in this step, two procedures of sending the logical address and sending the first identification information are not executed strictly sequentially. One may be sent first, and then the other is sent; or both may be sent in a form of a message, command, or packet defined in a protocol.

S14. When it is determined that the logical address belongs to the address corresponding to the user data, convert the logical address into a second physical address, then send the second physical address to a storage controller, and send second identification information to the storage controller.

This step is a branch parallel to S13. When it is determined that the logical address belongs to the address corresponding to the user data, the logical address cannot be "transparently transmitted" like that in S13, but the logical address is converted into the second physical address and then the second physical address is sent to the storage controller (certainly, some standard operations such as command encapsulation and sending that are based on a specific protocol and that are described in step 13 are also involved).

A specific conversion method is similar to a prior-art conversion implementation method, and details are not described in detail in this embodiment.

It should be noted that, similar to S13, in this step, no limitation is imposed on a sequence of performing steps of sending the second physical address and sending the second identification information.

S15. When receiving the first identification information, the storage controller converts the received logical address into a first physical address, and accesses data in a flash memory chip according to the first physical address; or when receiving the second identification information, the storage controller accesses information about data in a flash memory chip by using the received second physical address.

The storage controller receives, by using a standard protocol interface (for example, the eMMC protocol), information sent by the logical address processing module of the host. In this embodiment, only according to a received "address", the storage controller cannot know whether this address represents a "logical address" or a converted "physical address", and cannot know how to process the logical address or physical address. Therefore, a piece of information is required to instruct the storage controller how to process the logical address or physical address. The information is the first identification information and the second identification information. The storage controller uses a corresponding processing policy by determining which identification information is received. That is, after receiving the first identification information, the storage controller performs address conversion, and accesses the data in the flash memory chip according to the converted first physical address. After receiving the second identification information, the storage controller directly accesses the data in the flash memory chip according to the received second physical address.

The identification information (including the first identification information and the second identification information) may be implemented based on an existing protocol or by using a proprietary protocol. Usually, for ease of implementation, the identification information may be implemented based on an existing protocol, for example, may be extended based on some reserved fields in a protocol, or may be implemented by using a reserved command.

In an example in which the host communicates with the storage controller by using the eMMC protocol, the identification information may be transferred by using a reserved command in the eMMC protocol. In the eMMC protocol, both communication parties transfer identification information based on a command (Command, CMD). CMD 60 to CMD 63 are reserved commands. Therefore, these commands can be used to transfer the identification information.

For example, in S13, when the logical address processing module needs to send the logical address, a command CMD 60 may be first sent, and simultaneously, a parameter 0x754C4241 is carried, where the parameter 0x754C4241 indicates that the first identification information has been sent. Similarly, in S14, when the logical address processing module needs to send the second physical address, a command CMD 60 may be first sent, where the CMD 60 carries a parameter 0x7550504E indicating that the second identification information has been sent.

These commands (for example, the CMD 60) used to transfer the identification information may be sent before each access request. Alternatively, these commands may be sent when a request of a different type is accessed for a first time, and a previous result is used for a subsequent access request. For example, at first, the CMD 60 is used to send a piece of first identification information. In this case, if no command CMD 60 is sent subsequently, but access commands are directly sent, all these subsequent access commands are the first identification information by default unless the command CMD 60 is sent again to indicate that the second identification information has been sent. In this way, subsequent access commands are the second identification information by default.

After receiving these commands, the storage controller knows how to process "addresses" in the received commands subsequently (for example, performs access directly according to the addresses or performs address conversion).

It should be noted again that, as finally mentioned in S13 and S14, the identification information is unnecessarily sent before a logical address is sent. According to different definitions of various commands (or packets or messages) in different protocols, the identification information may be sent after a logical address is sent, or may be sent simultaneously when a logical address is sent (for example, may be encapsulated in one command, or may be sent after being encapsulated in one packet).

In addition, it should be further noted that the foregoing steps are logical steps, and may not be in a one-to-one-correspondence with steps from a perspective of actually implemented code. A logical meaning indicated by code that does not exactly matches the steps from a perspective of a literal meaning of the code matches the foregoing steps. For example, for S12, determining is performed only once from a perspective of code, that is, whether a received logical address belongs to a range A is determined, and if the received logical address belongs to the range A, an operation is performed, or if the received logical address does not belong to the range A, another operation is performed. Literally, this seems inconsistent with S12. However, with reference to another condition (for example, only two types of addresses are defined, the range A is defined as a logical address corresponding to operating system data, and the rest is naturally a logical address corresponding to user data), it can be found that these steps are the same as S12 at the logical layer. Specific implementations of these steps are relatively flexible from a perspective of software, and these steps also belong to a technology well known by a person skilled in the art, and details are not described in the embodiments of the present invention.

In this embodiment of the present invention, a part of a function of converting a logical address into a physical address by the storage controller originally is implemented by the host. Because a processing capability of the host is usually higher than that of the storage controller, a speed of accessing the storage device by the host can be increased.

In addition, because the host manages mapping between a physical address and a logical address of a flash memory chip, the host can manage the physical address of the flash memory chip and running processes of various algorithms (for example, an address mapping algorithm) more directly, and can initiate an operation such as a garbage collection or wear leveling at a proper opportunity according to a running status of the host itself. This enhances management on the storage device and reduces impact of a NAND bad block and a data fragment on storage performance. Moreover, when a fault occurs, the fault can be located more clearly.

Embodiment 2

Based on Embodiment 1, the foregoing embodiment is described in this embodiment by using two specific examples. In this embodiment, it is assumed that a host and a storage controller are based on an eMMC protocol and that a flash memory chip has a total physical space of 10000 bytes (the value is used only as an example, and an actual physical space is far greater than the value), where the first 2000 bytes are used for operating system data (including management information), and a remaining physical space of 8000 bytes is allocated for user data. In addition, it is assumed that the physical space of 2000 bytes is mapped to a logical address space between 100 bytes and 2099 bytes on a host (kernel) side, and the physical space of 8000 bytes is mapped to a logical address space between 2100 bytes and 10099 bytes on a storage controller side. Details are shown in Table 1.

TABLE 1

| Location | Logical address space | Physical address space |
|---|---|---|
| Host (kernel) | 100-2099 | 0-1999 |
| Storage controller | 2100-10099 | 2000-9999 |

Example 1

S21. An application sends, to a file system, a first request for file access.

S22. The file system converts the first request into a second request for performing access by using a logical address, where the logical address that is used for access and that is carried in the second request is a logical address between 2201 bytes and 2300 bytes; and sends the second request to the kernel.

S23. The kernel determines that the logical address between 2201 bytes and 2300 bytes belongs to an address corresponding to the user data, converts the logical address between 2201 bytes and 2300 bytes into a physical address between 2101 bytes and 2200 bytes, resends, to the storage controller, the second request after encapsulating the second request according to a requirement in the eMMC protocol, and sends a piece of identification information indicating that a type is a physical address (that is, indicating that a memory does not need to perform conversion subsequently).

S24. The storage controller directly accesses a physical address between 2101 bytes and 2200 bytes of the flash memory chip after receiving the access request based on the physical address between 2101 bytes and 2200 bytes.

Example 2

S31. An application sends, to a file system, a first request for file access.

S32. The file system converts the first request into a second request for performing access by using a logical address, where the logical address that is used for access and that is carried in the second request is a logical address between 100 bytes and 199 bytes; and sends the second request to the kernel.

S33. The kernel determines that the logical address between 100 bytes and 199 bytes belongs to an address corresponding to the operating system data, "transparently transmits", to the storage controller, a third request including the logical address between 100 bytes and 199 bytes after encapsulating the third request according to a requirement in the eMMC protocol, and sends a piece of identification information indicating that a type is a logical address (that is, indicating that a memory needs to perform conversion subsequently).

S34. The storage controller converts the logical address between 100 bytes and 199 bytes into a physical address between 0 bytes and 99 bytes after receiving the third request, and accesses the flash memory chip by using the physical address between 0 bytes and 99 bytes.

Embodiment 3

Based on the foregoing embodiments, this embodiment discloses a communications device using a boot loader (for example, a terminal device such as a mobile phone or a tablet) and a method for accessing a storage device by the communications device. The communications device in this embodiment includes a host and the storage device in the foregoing embodiments. The host communicates with the storage device by using a protocol such as an eMMC protocol. The host mainly includes a CPU. Certainly, to ensure that the CPU can run better, the host may further include a memory used for storing data. In addition, some peripheral circuits (for example, a circuit related to power source management and an interface circuit that communicates with a peripheral device) are further required.

A boot loader (which is usually described as a boot loader or a bootloader in English) is used in a process of using the communications device in this embodiment. The boot loader is a program that is used to boot an operating system. The program is a fixed program that adapts to the CPU, and is generally provided by a CPU manufacturer. Another manufacturer that uses the CPU generally does not modify the program.

In addition, an existing boot loader uses a logical address to access operating system data stored in a storage chip. In the foregoing embodiments, because the storage controller may still convert a logical address into a physical address for the operating system data, the existing boot loader can still work, implementing compatibility.

In the process, some adaptive work needs to be carried out for the storage controller. Details are as follows:

Because the boot loader itself does not have the capability, mentioned in the foregoing embodiments, of sending the identification information mentioned in the foregoing embodiments, the storage controller cannot know how to perform processing when an address is received. In this case, the storage controller may perform processing on the received logical address by default according to a logical address after being powered on, that is, after the storage controller is powered on, the received logical address is considered as a logical address by default if no identification information is received. Then, the logical address is converted, and a flash memory chip is accessed after the logical address is converted into a physical address. Specific implementation methods may be different according to different manners of transferring the identification information. For example, when the identification information is carried in a predefined field of a message, whether the identification information is available may be known by reading the field; when the identification information is transferred based on an independent command (for example, the identification information is transferred by using a CMD 60 illustrated in the foregoing specification), if the command is not received, it can be considered that the identification information is not received.

Embodiment 4

Figure 3:
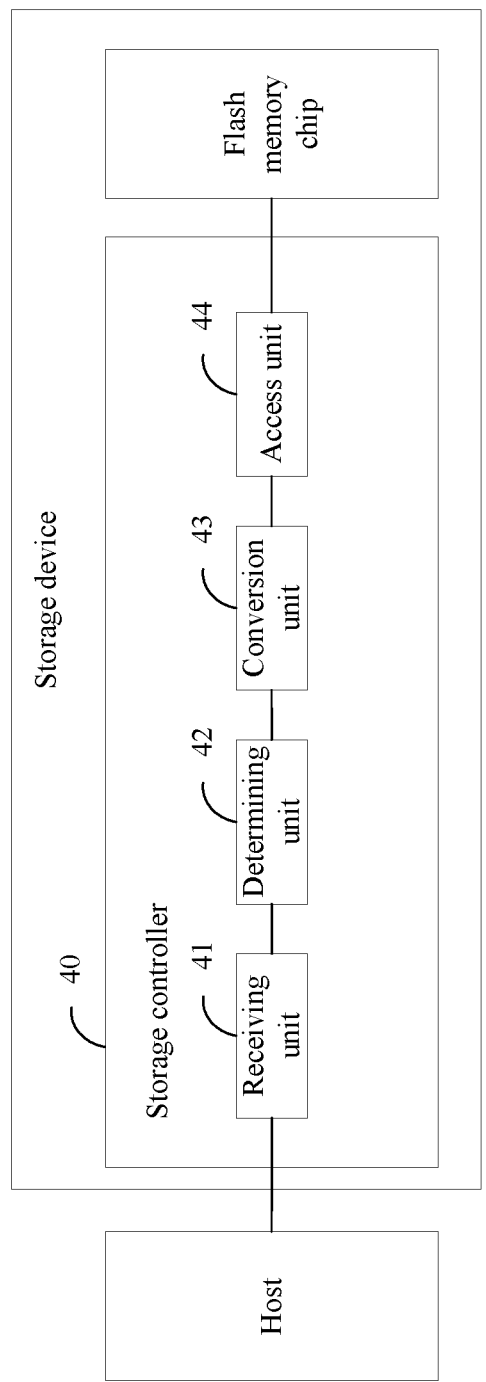
FIG. 3 is a schematic structural diagram of a storage device according to Embodiment 4 of the present invention.

Based on the foregoing embodiments, this embodiment of the present invention discloses a storage controller. The storage controller is located in a storage device. The storage device further includes at least one flash memory chip that communicates with the storage controller. Referring to FIG. 3, the storage controller includes a receiving unit 41, a determining unit 42, a conversion unit 43, and an access unit 44. These units are configured to perform steps in Embodiment 1. Details are as follows:

The receiving unit is configured to receive a first address used to access a flash memory chip and identification information used to indicate an address type of the first address, where the first address and the identification information are sent by a host. The identification information is first identification information or second identification information. The first address is sent by a logical address processing module located at a bottom software layer of the host. The logical address processing module determines, after receiving a first logical address sent by a logical address sending module located at an upper software layer of the host, whether the first logical address belongs to a logical address corresponding to operating system data or a logical address corresponding to user data; and when determining that the first logical address belongs to the logical address corresponding to the operating system data, sends the first logical address to the storage controller and sends the first identification information to the storage controller, where in this case, the first address is the first logical address; or when determining that the first logical address belongs to the logical address corresponding to the user data, converts the first logical address into a second physical address, then sends the second physical address to the storage controller, and sends the second identification information to the storage controller, where in this case, the first address is the second physical address.

The determining unit is configured to determine whether the received identification information is the first identification information or the second identification information.

When the determining unit determines that the identification information is the first identification information, the conversion unit is configured to convert the first address received by the receiving unit into a first physical address, and the access unit is configured to access the flash memory chip according to the first physical address obtained by the conversion unit by means of conversion.

When the determining unit determines that the identification information is the second identification information, the access unit is configured to access the flash memory chip according to the first address received by the receiving unit.

For specific execution methods of the units, reference may be made to related steps in the foregoing embodiments (for example, Embodiment 1, Embodiment 2, and Embodiment 3), and details are not repeated herein.

It should be noted that the units are obtained by means of logical division, and may be based on a hardware structure in FIG. 1 in terms of a specific hardware structure, that is, a processor (for example, a CPU) is used to read code stored in a memory (RAM+ROM), so as to execute a corresponding software program.

Embodiment 5

Figure 4:
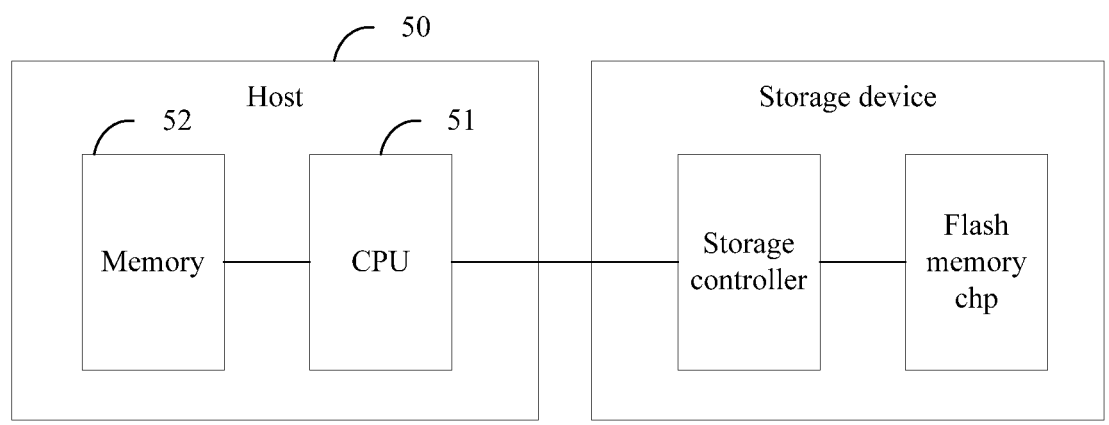
FIG. 4 is a schematic structural diagram of a host according to Embodiment 5 of the present invention.

Referring to FIG. 4, based on the foregoing embodiments, this embodiment of the present invention discloses a host 50. The host in this embodiment of the present invention includes a processor (for example, a CPU) 51 and a memory (which may include, for example, a ROM and a RAM). The memory stores an instruction to be executed by the processor. The processor reads the instruction in the memory to perform related steps in the foregoing related embodiments (for example, Embodiment 1 and Embodiment 2), so as to implement communication with a storage device.

The foregoing descriptions are merely examples of the embodiments of the technical solutions of the present invention, but are not intended to limit the protection scope of the present invention. Any modification, equivalent replacement, or improvement made without departing from the spirit and principle of the present invention shall fall within the protection scope of the present invention.

What is claimed is:

1. A method for accessing data in a storage device, wherein the method is executed by a storage controller located in the storage device, the storage device further comprises at least one flash memory chip that communicates with the storage controller, and the method comprises:
receiving a first address used to access a flash memory chip and identification information used to indicate an address type of the first address, wherein the first address and the identification information are sent by a host, wherein the identification information is first identification information or second identification information, wherein the first identification information indicates that the first address is a logical address corresponding to operating system data, and wherein the second identification information indicates that the first address is a second physical address corresponding to user data;
in response to determining that the identification information is the first identification information, converting the first address into a first physical address, and accessing the flash memory chip according to the first physical address; and
in response to determining that the identification information is the second identification information, accessing the flash memory chip according to the received first address.

2. The method according to claim 1, wherein:
the operating system data is software data of the operating system itself and data generated by the operating system in a running process; and
the user data is data that is written by a user into the storage device after the operating system is installed.

3. The method according to claim 1, wherein the method further comprises:
after power-on, if no identification information is received, using an address in a received access request as a logical address;
converting the address into a third physical address; and
accessing the flash memory chip according to the third physical address.

4. A data storage method, wherein the method comprises:
receiving a first logical address;
determining whether the logical address belongs to a logical address corresponding to operating system data or a logical address corresponding to user data;
when determining that the logical address belongs to the logical address corresponding to the operating system data, sending the first logical address to a storage controller, and sending first identification information to the storage controller, wherein the first identification information is used to indicate that an address sent to the storage controller belongs to a logical address corresponding to operating system data; and
when determining that the logical address belongs to the logical address corresponding to the user data, converting the first logical address into a second physical address, then sending the second physical address to the storage controller, and sending, to the storage controller, second identification information, wherein the second identification information is used to indicate that an address sent to the storage controller belongs to a physical address corresponding to user data.

5. The method according to claim 4, wherein:
the operating system data is data of software data of the operating system itself and data generated by the operating system in a running process; and the user data is data that is written by a user into a storage device after the operating system is installed.

6. A storage controller, wherein the storage controller is located in a storage device, the storage device further comprises at least one flash memory chip that communicates with the storage controller, and the storage controller comprises a processor, wherein the processor is configured to read an instruction stored in a memory to execute:
receiving a first address used to access a flash memory chip and identification information used to indicate an address type of the first address, wherein the first address and the identification information are sent by a host, wherein the identification information is first identification information or second identification information, wherein the first identification information indicates that the first address is a logical address corresponding to operating system data, and wherein the second identification information indicates that the first address is a second physical address corresponding to user data;
determining whether the received identification information is the first identification information or the second identification information;
in response to determining that the identification information is the first identification information, converting the first address into a first physical address, and accessing the flash memory chip according to the first physical address; and
in response to determining that the identification information is the second identification information, accessing the flash memory chip according to the first address.

7. The storage controller according to claim 6, wherein:
the operating system data is software data of the operating system itself and data generated by the operating system in a running process; and
the user data is data that is written by a user into the storage device after the operating system is installed.

8. The storage controller according to claim 6, wherein the processor is further configured to execute:
determining whether the identification information is received after power-on;
in response to determining that no identification information is received, using an address in a received access request as a logical address, and converting the address into a third physical address; and
accessing the flash memory chip according to the third physical address.

9. A host, comprising a processor and a memory, wherein the memory stores an instruction to be executed by the processor, the instruction causing the processor to:
receive a first logical address;
determine whether the first logical address belongs to a logical address corresponding to operating system data or a logical address corresponding to user data;
when determining that the first logical address belongs to the logical address corresponding to the operating system data, send the first logical address to a storage controller, and send first identification information to the storage controller, wherein the first identification information is used to indicate that an address sent to the storage controller belongs to a logical address corresponding to operating system data; and
when determining that the first logical address belongs to the logical address corresponding to the user data, convert the first logical address into a second physical address, then send the second physical address to the storage controller, and send, to the storage controller, second identification information, wherein the second identification information is used to indicate that an address sent to the storage controller belongs to a physical address corresponding to user data.

10. The host according to claim 9, wherein:
the operating system data is software data of the operating system itself and data generated by the operating system in a running process; and
the user data is data that is written by a user into a storage device after the operating system is installed.

11. A storage device, comprising a storage controller and at least one flash memory chip that communicates with the storage controller, wherein the storage controller is located in the storage device, and the storage controller is configured to:
receive a first address used to access a flash memory chip and identification information used to indicate an address type of the first address, wherein the first address and the identification information are sent by a host, the identification information is first identification information or second identification information, wherein the first identification information indicates that the first address is a logical address corresponding to operating system data, and wherein the second identification information indicates that the first address is a second physical address corresponding to user data;
determine whether the received identification information is the first identification information or the second identification information;
in response to determining that the identification information is the first identification information, convert the first address into a first physical address, and access the flash memory chip according to the first physical address; and
in response to determining that the identification information is the second identification information, access the flash memory chip according to the first address.

12. The storage device according to claim 11, wherein:
the operating system data is software data of the operating system itself and data generated by the operating system in a running process; and
the user data is data that is written by a user into the storage device after the operating system is installed.

13. The storage device according to claim 11, wherein the storage controller is further configured to:
determine whether the identification information is received after power-on;
in response to determining that no identification information is received, use an address in a received access request as a logical address, and convert the address into a third physical address; and
access the flash memory chip according to the third physical address.

14. A storage device, comprising a host, a storage controller and at least one flash memory chip that communicates with the storage controller, wherein the host is configured to:
receive a first logical address;
determine whether the first logical address belongs to a logical address corresponding to operating system data or a logical address corresponding to user data;
when determining that the first logical address belongs to the logical address corresponding to the operating system data, send the first logical address to the storage controller, and send first identification information to the storage controller; and when determining that the first logical address belongs to the logical address corresponding to the user data, convert the first logical address into a second physical address, then send the second physical address to the storage controller, and send, to the storage controller, second identification information;

wherein the storage controller is configured to:

in response to determining that the identification information is the first identification information, convert the first logical address into a first physical address, and access the flash memory chip according to the first physical address; and in response to determining that the identification information is the second identification information, access the flash memory chip according to the second physical address.

15. The storage device according to claim 14, wherein:

the operating system data is software data of operating system itself and data generated by the operating system in a running process; and the user data is data that is written by a user into the storage device after the operating system is installed.

16. The storage device according to claim 14, wherein the storage controller is further configured to:

determine whether the identification information is received after power-on;

in response to determining that no identification information is received, use an address in a received access request as a logical address, and convert the address into a third physical address; and access the flash memory chip according to the third physical address.

* * * * *